United States Patent
Sakai et al.

(10) Patent No.: US 12,441,620 B2
(45) Date of Patent: Oct. 14, 2025

(54) METHOD FOR PRODUCING TRICHLOROSILANE AND METHOD FOR PRODUCING POLYCRYSTALLINE SILICON ROD

(71) Applicant: Tokuyama Corporation, Yamaguchi (JP)

(72) Inventors: Junya Sakai, Yamaguchi (JP); Shoji Iiyama, Yamaguchi (JP); Kunihiko Matsumura, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 49 days.

(21) Appl. No.: 18/834,283

(22) PCT Filed: Oct. 28, 2022

(86) PCT No.: PCT/JP2022/040486
§ 371 (c)(1),
(2) Date: Jul. 30, 2024

(87) PCT Pub. No.: WO2023/074872
PCT Pub. Date: May 4, 2023

(65) Prior Publication Data
US 2025/0128953 A1    Apr. 24, 2025

(30) Foreign Application Priority Data

Nov. 1, 2021 (JP) .................. 2021-178607

(51) Int. Cl.
*C01B 33/107* (2006.01)
*C23C 16/24* (2006.01)
*C23C 16/54* (2006.01)

(52) U.S. Cl.
CPC .......... *C01B 33/1071* (2013.01); *C23C 16/24* (2013.01); *C23C 16/545* (2013.01)

(58) Field of Classification Search
CPC . C01B 33/1071; C01B 33/035; C01B 33/107; C23C 16/24; C23C 16/545
See application file for complete search history.

(56) References Cited

U.S. PATENT DOCUMENTS 9,321,653 B2    4/2016  Akiyoshi et al.
2019/0233295 A1*  8/2019  Yamashita .......... C01B 33/1071

FOREIGN PATENT DOCUMENTS

JP    S56-73617 A    6/1981
JP    3324922 B2     9/2002
(Continued)

OTHER PUBLICATIONS

Machine translation, KR-101672976-B1 (Year: 2016).*
(Continued)

*Primary Examiner* — Michael G Miller
(74) *Attorney, Agent, or Firm* — CAHN & SAMUELS, LLP

(57) ABSTRACT

[Problem to be solved] Provided is a method that enables effective industrial use of an exhaust gas containing hydrogen to be discharged during production of trichlorosilane. [Solution] Provided is a method for producing trichlorosilane, the method comprising: reacting metallic silicon and tetrachlorosilane with a mixed gas containing hydrogen to generate trichlorosilane. The mixed gas containing hydrogen contains 1 to 500 molar ppm of hydrogen chloride and 100 to 10,000 molar ppm of silane hydride, and the mixed gas is heated at 100° C. to 450° C. and then reacted.

8 Claims, 2 Drawing Sheets

(56) References Cited

FOREIGN PATENT DOCUMENTS

| | | |
|---|---|---|
| JP | 3708648 B2 | 10/2005 |
| JP | 2011168443 A | 9/2011 |
| JP | 2014043389 A | 3/2014 |
| KR | 101672796 B1 * | 11/2016 |
| WO | 2018074268 A1 | 4/2018 |

OTHER PUBLICATIONS

English abstract for JPS56-73617A, Jun. 18, 1981.
English abstract for JP2014043389A, Mar. 13, 2014.
English abstract for JP3324922, Sep. 17, 2002.
English abstract for JP3708648, Oct. 19, 2005.
English abstract for JP2011168443, Sep. 1, 2011.
English abstract for WO2018074268, Apr. 26, 2018.
International Preliminary Report on Patentability for PCT/JP2022/040486, May 2024, pp. 1-5.

* cited by examiner

[Figure 1]
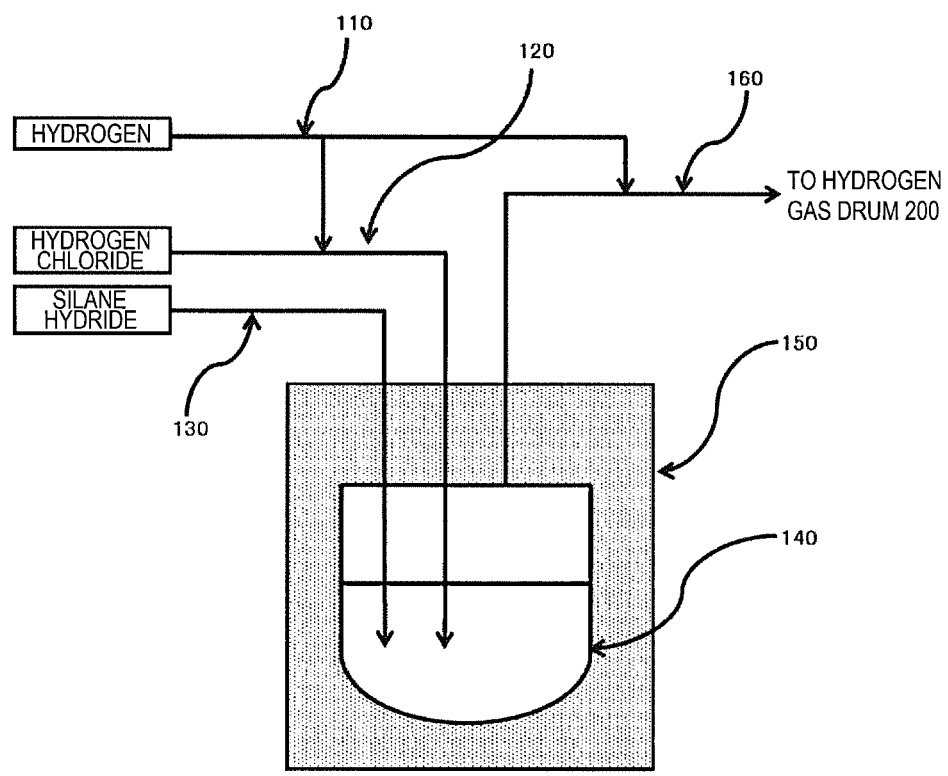

[Figure 2]
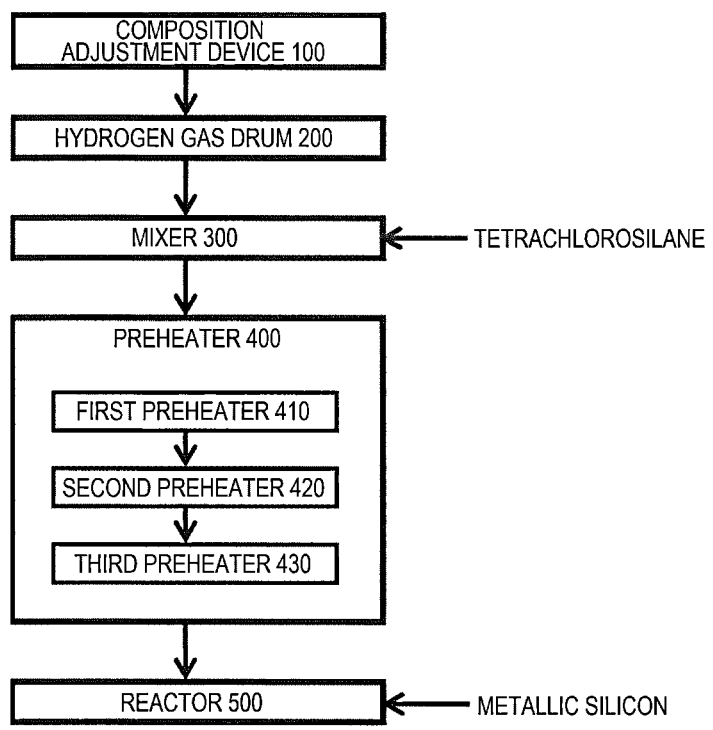

METHOD FOR PRODUCING TRICHLOROSILANE AND METHOD FOR PRODUCING POLYCRYSTALLINE SILICON ROD

This application is a U.S. national stage application of PCT/JP2022/040486 filed on 28 Oct. 2022 and claims priority to Japanese patent document 2021-178607 filed on 1 Nov. 2021, the entireties of which are incorporated herein by reference.

TECHNICAL FIELD

The present invention relates to a method for producing trichlorosilane. More specifically, the present invention relates to a method for producing trichlorosilane, which effectively utilizes exhaust gas to be discharged.

BACKGROUND ART

Trichlorosilane ($SiHCl_3$) is a useful compound as a raw material for producing polycrystalline silicon and is reacted with hydrogen at a high temperature of 1000° C. or higher, and thus reactions of the following formulae (1) and (2) mainly occur, and high-purity polycrystalline silicon is deposited.

$$4SiHCl_3 \rightarrow Si+3SiCl_4+2H_2 \qquad (1)$$

$$SiHCl_3+H_2 \rightarrow Si+3HCl \qquad (2)$$

Such trichlorosilane is generally produced by reacting metallic silicon with hydrogen chloride. For example, Patent Literature 1 discloses a method for producing trichlorosilane by reacting metallic silicon and hydrogen chloride in the presence of a catalyst containing iron and aluminum by using a fluidized bed reactor.

In the above production method, trichlorosilane is produced from metallic silicon and hydrogen chloride by a reaction of the following formula (3).

$$Si+3HCl \rightarrow SiHCl_3+H_2 \qquad (3)$$

Further, tetrachlorosilane ($SiCl_4$), which is a by-product during the production of polycrystalline silicon, is converted into trichlorosilane and reused for producing polycrystalline silicon. For example, Patent Literature 2 discloses a method for producing trichlorosilane by reacting metallic silicon with tetrachlorosilane and hydrogen in a fluidized bed in the presence of a copper silicide catalyst. In the production method, trichlorosilane is produced from metallic silicon, tetrachlorosilane and hydrogen according to the following reaction formula (4).

$$3SiCl_4+2H_2+Si \rightarrow 4SiHCl_3 \qquad (4)$$

The production method requires a high reaction temperature as compared with the above-described method for producing trichlorosilane, and has disadvantages that a reaction rate is slow and production cost is high. Therefore, the production of trichlorosilane is mainly carried out by the reaction of the metallic silicon with the hydrogen chloride, and the production method of the formula (4) is supplementarily carried out for the reuse of tetrachlorosilane which is a by-product during the production of polycrystalline silicon.

In the method for producing trichlorosilane by the reaction of the formula (3) by reacting the hydrogen chloride with the metallic silicon, a side reaction of the following formula (5) is caused, and tetrachlorosilane is generated as a by-product and dichlorosilane is also generated as a trace by-product.

$$Si+4HCl \rightarrow SiCl_4+2H_2 \qquad (5)$$

Therefore, a gas generated by the reaction of the metallic silicon with the hydrogen chloride is cooled to a predetermined temperature or lower to condense and separate a mixture of chlorosilane containing trichlorosilane, the trichlorosilane is separated and recovered from the obtained condensate by distillation, and the recovered trichlorosilane is used as a raw material for producing polycrystalline silicon. The tetrachlorosilane separated by distillation is mainly reused in a production process of trichlorosilane by the reaction of formula (4) that is supplementarily carried out.

An exhaust gas, which is obtained by condensing and separating the chlorosilane from a reaction product gas, contains hydrogen as a main component, but contains a small amount of boron or the like contained as an inevitable impurity in the metallic silicon in addition to unreacted hydrogen chloride and a small amount of chlorosilane remaining without being condensed and separated. Since such impurities degrade the quality of polycrystalline silicon, it is necessary to suppress contamination of impurities as much as possible in trichlorosilane used as a raw material for producing polycrystalline silicon. Therefore, a part of the exhaust gas containing impurities is circulated as a carrier gas in a reaction system that generates the exhaust gas, but most of the exhaust gas is discarded through an appropriate treatment. However, as a production amount of trichlorosilane increases, an amount of exhaust gas to be discarded after the chlorosilane is separated also increases, and it has been desired to establish an effective method for reusing such an exhaust gas.

Further, Patent Literature 3 proposes a method for producing trichlorosilane in which metallic silicon particles, hydrogen chloride, tetrachlorosilane, and hydrogen are supplied into a fluidized bed reactor filled with the metallic silicon particles, and a reaction for producing trichlorosilane by metallic silicon and the hydrogen chloride and a reaction for producing trichlorosilane by a reaction of the metallic silicon with the tetrachlorosilane and the hydrogen simultaneously proceed in the reactor.

CITATION LIST

Patent Literature

Patent Literature 1: JP3324922B
Patent Literature 2: JP3708648B
Patent Literature 3: JPS56-73617A
Patent Literature 4: JP2011-168443A

SUMMARY OF INVENTION

Technical Problem

The method for producing trichlorosilane proposed in Patent Literature 3 has advantages that, since two trichlorosilane generation reactions proceed simultaneously in the same reactor, tetrachlorosilane and hydrogen which are produced as a by-product of reaction (generation reaction by metallic silicon and hydrogen chloride) are consumed in a trichlorosilane generation reaction in the other reaction, and generation of tetrachlorosilane contained in an exhaust gas can be suppressed as much as possible. The generated exhaust gas can be circulated and supplied to the reactor, and a problem associated with a large amount of the exhaust gas can be effectively solved.

However, in the above method, two reactions with different reaction conditions have to proceed simultaneously, and therefore, there is a fatal problem such as a decrease in conversion rate to trichlorosilane.

For example, in the reaction of the formula (3) in which trichlorosilane is generated by the reaction of metallic silicon with hydrogen chloride, a conversion rate to trichlorosilane tends to decrease as a reaction temperature increases, and the reaction temperature is set in a range of 250° C. to 400° C. Further, in the reaction of producing trichlorosilane by the reaction of tetrachlorosilane with metallic silicon and hydrogen, in order to ensure an appropriate reaction rate and selectivity, the reaction temperature is set to a range of 400° C. to 700° C., preferably 450° C. to 600° C. As understood from this, in a case where two reactions simultaneously proceed in the same reactor, if the reaction temperature is matched to one reaction, a conversion rate in the other reaction decreases, and if the reaction temperature is matched to the other reaction, a conversion rate in the one reaction decreases. As a result, the reaction temperature is set in the vicinity of a boundary region between both reactions (about 400° C.). However, since the reaction temperature is not in an optimum range for any reaction, both reactions cannot be carried out under an optimum condition.

As a method for solving the problem described in Patent Literature 3, Patent Literature 4 proposes a method for producing trichlorosilane. The method includes a first production process of reacting hydrogen chloride with metallic silicon to generate trichlorosilane and a second production process of reacting tetrachlorosilane and hydrogen with metallic silicon to generate trichlorosilane as processes independent of each other. The trichlorosilane is condensed and separated from a reaction product gas containing the trichlorosilane obtained by the first production process, and an exhaust gas obtained by condensing and separating the trichlorosilane is supplied to the second production process as a hydrogen source.

The method for producing trichlorosilane proposed in Patent Literature 4 has advantages that the exhaust gas containing hydrogen as a main component generated in the first production process can be supplied as a hydrogen source to the second production process as it is without performing a special refining treatment, and the second production process can also be carried out as in the related art without newly adding a special refining device or the like.

However, the present inventors have found by studies that when the exhaust gas containing hydrogen as a main component recovered by the method described in Patent Literature 4 is used as a hydrogen source for the second production process, that is, for generating trichlorosilane by reacting metallic silicon with tetrachlorosilane and hydrogen, erosion or corrosion cracking may occur in a production apparatus used for the reaction. In particular, the present inventors have found that erosion or corrosion cracking occurs remarkably when the second production process is continuously carried out for a long period of time, and there is still room for improvement from the viewpoint of continuously using the exhaust gas as a hydrogen source for a long period of time.

Therefore, an object of the present invention is to provide a method that enables effective industrial use of an exhaust gas containing hydrogen to be discharged during production of trichlorosilane.

Solution to Problem

The present inventors have conducted intensive studies on the above problems. First, the cause of erosion or corrosion cracking in the production apparatus has been investigated. As a result, it has been found that trichlorosilane is condensed and separated from a reaction product gas containing the trichlorosilane, and an exhaust gas obtained by condensing and separating the trichlorosilane contains hydrogen as a main component but also contains a small amount of hydrogen chloride. It has been found that erosion or corrosion cracking occurs in the production apparatus when the gas containing hydrogen chloride is heated to the reaction temperature. Further, it has also been found that erosion or corrosion cracking is less likely to occur when silane hydride is contained in addition to hydrogen and hydrogen chloride.

Based on these findings, as a result of conducting studies on conditions when the exhaust gas obtained by condensing and separating the trichlorosilane is used as a hydrogen source for generating trichlorosilane by reacting tetrachlorosilane and hydrogen with metallic silicon, the present inventors have found that occurrence of erosion or corrosion cracking in a production apparatus can be suppressed and the gas can be continuously used for a long period of time by setting concentrations of hydrogen chloride and silane hydride contained in the gas within a specific range and further heating the gas at a predetermined temperature before the gas is subjected to the reaction, and have completed the present invention.

That is, the present invention is a method for producing trichlorosilane, the method including: reacting metallic silicon and tetrachlorosilane with a mixed gas containing hydrogen to generate trichlorosilane, in which the mixed gas containing hydrogen contains 1 to 500 molar ppm of hydrogen chloride and 100 to 10,000 molar ppm of silane hydride, and the mixed gas is heated at 100° C. to 450° C. and then reacted.

A first aspect of the present invention can preferably adopt the following aspects.

(1) The mixed gas containing hydrogen is held for at least 3 seconds at 100° C. to 450° C. and then reacted.

(2) The mixed gas containing hydrogen is mixed with tetrachlorosilane, and then the mixed gas containing the tetrachlorosilane is heated at 100° C. to 450° C.

(3) The mixed gas containing hydrogen contains an exhaust gas obtained by condensing and separating trichlorosilane from a reaction product gas containing the trichlorosilane obtained by reacting metallic silicon with hydrogen chloride to generate the trichlorosilane.

(4) The mixed gas containing hydrogen contains an exhaust gas obtained by condensing and separating trichlorosilane from a reaction product gas containing the trichlorosilane obtained by reacting metallic silicon and tetrachlorosilane with hydrogen to generate the trichlorosilane.

(5) The mixed gas containing hydrogen contains an exhaust gas obtained by condensing and separating trichlorosilane from an exhaust gas obtained by reacting the trichlorosilane with hydrogen to generate polycrystalline silicon.

(6) The method includes: obtaining a reaction product gas containing trichlorosilane by any one production method of the present invention, and then condensing and separating the trichlorosilane from the reaction product gas.

A second aspect of the present invention is a method for producing a polycrystalline silicon rod, the method including: using a reaction furnace having a structure in which an interior is sealed with a bell jar and a bottom plate, the bottom plate is provided with an electrode pair for holding a plurality of silicon core wires and energizing the silicon core wires, and a plurality of gas supply nozzles for supplying a raw material gas for silicon deposition to an internal space of the bell jar are provided; and ejecting the raw material gas for silicon deposition from the gas supply nozzles while energizing the silicon core wires to deposit polycrystalline silicon on the silicon core wires, in which the raw material gas for silicon deposition contains the trichlorosilane obtained by the method according to above (6).

Advantageous Effects of Invention

According to the method for producing trichlorosilane of the present invention, an exhaust gas mainly containing hydrogen, which is obtained by separating trichlorosilane from a reaction product gas containing trichlorosilane in the production of trichlorosilane, can be used as a hydrogen source for producing trichlorosilane by reacting metallic silicon with tetrachlorosilane and hydrogen. In particular, since it is possible to suppress the occurrence of erosion or corrosion cracking in the production apparatus in the reaction, it is possible to stably use the exhaust gas for a long period of time.

As described above, since the exhaust gas during production of trichlorosilane can be effectively used, an amount of hydrogen to be used (hydrogen to be newly supplied) other than hydrogen contained in the exhaust gas can be significantly reduced, and production cost thereof can be significantly reduced.

BRIEF DESCRIPTION OF DRAWINGS

FIG. 1 is a schematic view showing an example of composition adjustment device for adjusting a composition of a mixed gas used in Examples; and FIG. 2 is a schematic view showing an example of a configuration of a production apparatus in Examples and Comparative Examples.

DESCRIPTION OF EMBODIMENTS

In a production method of the present invention, when an exhaust gas obtained by condensing and separating trichlorosilane is used as a hydrogen source for generating the trichlorosilane by reacting tetrachlorosilane and hydrogen with metallic silicon, concentrations of hydrogen chloride and silane hydride contained in the gas are set to a specific range, and the gas is further heated at 100° C. to 450° C. before the gas is subjected to a reaction. By employing such a production method of the present invention, it is possible to suppress occurrence of erosion and corrosion cracking in a production apparatus when the exhaust gas is used as a hydrogen source, and thus it is possible to stably produce trichlorosilane for a long period of time. The details of the reason why the production method of the present invention can suppress the occurrence of erosion and corrosion cracking in the production apparatus are unclear, but the present inventors presume as follows. That is, a main component of the exhaust gas obtained by condensing and separating the trichlorosilane is hydrogen, but the exhaust gas contains a small amount of hydrogen chloride. Therefore, when the exhaust gas is used as a hydrogen source in the production of trichlorosilane in which the tetrachlorosilane and the hydrogen are reacted with the metallic silicon, since a reaction temperature in the production is a high temperature (450° C. to 600° C.), it is presumed that the erosion or corrosion cracking occurs in the production apparatus due to a small amount of hydrogen chloride in the exhaust gas. Further, in the production method of the present invention, the exhaust gas containing a predetermined amount of hydrogen chloride and silane hydride is heated to a predetermined temperature and then used for the production of trichlorosilane. In this case, it is presumed that a small amount of silane hydride such as dichlorosilane or trichlorosilane is contained in the exhaust gas, the silane hydride is reacted with the hydrogen chloride by the heating, and a content of the hydrogen chloride in the exhaust gas is reduced. Therefore, it is presumed that the content of the hydrogen chloride in the exhaust gas after heating is reduced, and even when the exhaust gas is used for the production of trichlorosilane, the occurrence of erosion or corrosion cracking in the production apparatus can be suppressed, and the trichlorosilane can be stably produced for a long period of time.

In the present specification, unless otherwise specified, the notation "A to B" for the numerical values A and B means "A or more and B or less". In the notation, when a unit is added to only the numerical value B, the unit is also applied to the numerical value A. Hereinafter, a method for producing trichlorosilane of the present invention will be described in detail.

<Method for Producing Trichlorosilane>

In the production method of the present invention, trichlorosilane is produced by reacting metallic silicon and tetrachlorosilane with a mixed gas containing hydrogen. The reaction for producing trichlorosilane at this time is expressed by the following formula (4) as described above:

$$3SiCl_4 + 2H_2 + Si \rightarrow 4SiHCl_3 \qquad (4)$$

<Mixed Gas>

In the production method of the present invention, a mixed gas containing hydrogen as a main component, 1 to 500 molar ppm of hydrogen chloride, and 100 to 10,000 molar ppm of silane hydride is used as a hydrogen source for producing the trichlorosilane. By using the mixed gas containing hydrogen chloride and silane hydride in the above ranges after being heated to a predetermined temperature in advance, it is possible to suppress the occurrence of erosion and corrosion cracking in the production apparatus, and thus it is possible to stably produce trichlorosilane for a long period of time.

A content of the hydrogen chloride contained in the mixed gas is preferably small, more preferably in a range of 1 to 400 molar ppm, and particularly preferably in a range of 1 to 200 molar ppm, from the viewpoint of occurrence of erosion or corrosion cracking in the production apparatus.

The silane hydride contained in the mixed gas is silane having at least one Si—H bond in a molecule. Specific examples of the silane hydride include $SiH_4$, $SiH_3Cl$, $SiH_2Cl_2$, $SiHCl_3$, $SiH_3(CH_3)$, $SiH_2(CH_3)_2$, $SiH(CH_3)_3$, $SiH_2Cl(CH_3)$, $SiHCl_2(CH_3)$, $SiHCl(CH_3)_2$, $Si_2H_6$, and $Si_3H_8$. These silane hydrides may be contained alone, or a plurality of silane hydrides may be mixed. From the viewpoint of effectively utilizing an exhaust gas in the production of polycrystalline silicon and the exhaust gas in the production of trichlorosilane, the silane hydride preferably contains at least one selected from monochlorosilane ($SiH_3Cl$), dichlorosilane ($SiH_2Cl_2$), and trichlorosilane ($SiHCl_3$). Further, a content of the silane hydride is preferably in a range of 100 to 2000 molar ppm, and particularly preferably in a range of 100 to 1000 molar ppm from the viewpoint that the hydrogen chloride can be more efficiently consumed by heating.

From the same viewpoint, a molar ratio of the hydrogen chloride to the silane hydride in the mixed gas used in the production method of the present invention is preferably in a range of silane hydride/hydrogen chloride=1.0 to 100, more preferably in a range of 1.1 to 30, and particularly preferably in a range of 1.5 to 10.

Examples of the mixed gas containing the hydrogen as a main component, the hydrogen chloride, and the silane hydride includes:

1. an exhaust gas obtained by condensing and separating tetrachlorosilane from exhaust gas containing the tetrachlorosilane that is produced as a by-product during the production of polycrystalline silicon;

2. an exhaust gas obtained by condensing and separating trichlorosilane that is produced by reacting metallic silicon with hydrogen chloride; and 3. an exhaust gas obtained by condensing and separating trichlorosilane that is produced by reacting metallic silicon and tetrachlorosilane with hydrogen.

A cooling temperature of the gas when the tetrachlorosilane or trichlorosilane is condensed and separated from the exhaust gas may be equal to or lower than a temperature at which the tetrachlorosilane or trichlorosilane is condensed, and is appropriately determined in consideration of the cooling capacity of a cooling device and the like. The cooling temperature is generally set to −10° C. or lower, and particularly −30° C. or lower. The same applies to a pressure during condensation and separation, and the pressure is usually set at 300 kPaG or more, and particularly 500 kPaG or more. The exhaust gas obtained by condensing and separating the tetrachlorosilane or trichlorosilane is usually 95 to 99 mol % of hydrogen, and contains 100 to 6,000 molar ppm of hydrogen chloride and 5,000 to 50,000 molar ppm of silane hydride. The exhaust gas may be used alone as the hydrogen of the present invention, or may be mixed and used as the hydrogen of the present invention. When contents of the hydrogen chloride and the silane hydride in the exhaust gas are not in the above ranges, the contents of the hydrogen chloride and the silane hydride may be appropriately adjusted to be in the above ranges by, for example, mixing high-purity hydrogen containing no hydrogen chloride into the exhaust gas.

<Tetrachlorosilane>

The tetrachlorosilane used in the production method of the present invention is not particularly limited, but tetrachlorosilane that is produced as a by-product in a production process of polycrystalline silicon from trichlorosilane is used. Further, examples of the tetrachlorosilane include tetrachlorosilane that is produced as a by-product when trichlorosilane is generated from metallic silicon and hydrogen chloride by the reaction of the following formula (3) described above and is separated and recovered by distillation in a condensate containing chlorosilane:

$$Si+3HCl \rightarrow SiHCl_3+H_2 \quad (3),$$

and tetrachlorosilane that is produced as a by-product when trichlorosilane is generated from metallic silicon and hydrogen chloride by the reaction of the following formula (5) described above and is separated and recovered by distillation in a condensate containing chlorosilane:

$$Si+4HCl \rightarrow SiCl_4+2H_2 \quad (5).$$

<Metallic Silicon>

As the metallic silicon used in the production method of the present invention, any known solid substance containing silicon element in a metallic state, such as metallurgical metallic silicon, ferrosilicon, or polycrystalline silicon, is used without any limitation. In addition, impurities such as iron compounds contained in metallic silicon are not particularly limited in terms of types and contents. Furthermore, such metallic silicon is also used in the form of fine powder having an average particle size of about 100 μm to 300 μm.

<Catalyst>

Furthermore, in the production method of the present invention, a catalyst is preferably used from the viewpoint of increasing a reaction rate and efficiently producing trichlorosilane with high selectivity. As such a catalyst, those conventionally used in the reaction system, for example, a copper-based catalyst such as copper powder, copper chloride, or copper silicide, are used. It is also possible to use an iron component, or an iron component and an aluminum component in combination with these catalysts. Such a catalyst is used in an amount of 0.1 to 40% by weight, particularly 0.2 to 20% by weight in terms of copper with respect to metallic silicon.

<Production Apparatus>

As the production apparatus for carrying out the production method of the present invention, a known production apparatus can be used. For example, a fixed bed reactor, a fluidized bed reactor, or the like can be used as a reactor. In particular, a fluidized bed reactor is preferably used because trichlorosilane can be continuously produced by continuously supplying metallic silicon, tetrachlorosilane, and hydrogen as reactive species. In the production method of the present invention, hydrogen is heated to a predetermined temperature and then supplied to the reactor. The method for heating hydrogen is not limited, and a known method can be adopted. Examples thereof include a method in which a means for externally heating a hydrogen supply pipe connected to the reactor is attached, and the hydrogen flowing through the supply pipe is heated by the heating means, a method in which a hydrogen storage tank is installed and hydrogen in the storage tank is heated by the means for heating the storage tank, and then the hydrogen is supplied to the reactor, and a method in which hydrogen is heated by exchanging heat with exhaust gas from the reactor in a heat exchanger, and then the hydrogen is supplied to the reactor.

<Heating of Mixed Gas>

In the production method of the present invention, when trichlorosilane is produced by reacting metallic silicon, tetrachlorosilane, and hydrogen, the mixed gas is used as a hydrogen source, and the mixed gas is heated at 100° C. to 450° C. and then reacted. As described above, it is presumed that when the mixed gas containing the silane hydride and the hydrogen chloride is heated to 100° C. to 450° C. in advance, the silane hydride reacts with the hydrogen chloride to reduce the content of the hydrogen chloride. Therefore, from the viewpoint of reliably reacting the silane hydride with the hydrogen chloride, the mixed gas is preferably held in the range of 100° C. to 450° C. for at least 3 seconds, particularly preferably 5 seconds or more, and preferably 7 seconds or more. An upper limit of the time for which the mixed gas is held in the range of 100° C. to 450° C. may be any time as long as the content of hydrogen chloride can be sufficiently reduced, and may be appropriately determined in consideration of the production conditions, the capability of the apparatus, and the like. From the viewpoint of reliably reacting the silane hydride with the hydrogen chloride during the heating of the mixed gas, specifically, as the heating time for the mixed gas in the range of 100° C. to 450° C., it is sufficient to set the heating time to 1 hour or more in a heating temperature range of 100° C. to 200° C., 30 seconds or more in a temperature range of 200° C. to 300° C., 10 seconds or more in a temperature range of 300° C. to 400° C., and 3 seconds or more in a temperature range of 400° C. to 450° C. The time for which the mixed gas is held in the range of 100° C. to 450° C. indicates a time for which the hydrogen is in the temperature range. Therefore, when the temperature of the mixed gas is increased in the range of 100° C. to 450° C., the temperature elevation time is also included in the holding time. Therefore, when the mixed gas is heated while increasing the temperature from 100° C. to 450° C., a temperature elevation rate may be appropriately determined as long as the time within the temperature range is 3 seconds or more, and particularly, it is preferable that the temperature range of 400° C. to 450° C. is 3 seconds or more.

In the production method of the present invention, the mixed gas may be heated at 100° C. to 450° C. before the metallic silicon, the tetrachlorosilane, and the mixed gas are reacted, and the order of adding the metallic silicon, the tetrachlorosilane, and the mixed gas is not particularly limited. Therefore, the mixed gas may be heated at 100° C. to 450° C. and then brought into contact with the metallic silicon and the tetrachlorosilane, or the mixed gas and the tetrachlorosilane may be mixed to obtain a mixed gas, and then the mixed gas containing the tetrachlorosilane may be heated at 100° C. to 450° C. and then brought into contact with the mixed gas and the metallic silicon. The reaction of the metallic silicon, the tetrachlorosilane, and the mixed gas may be carried out at a temperature above 450° C.

<Production Condition of Trichlorosilane>

In the production method of the present invention, as described above, the mixed gas containing hydrogen as a main component and a predetermined amount of silane hydride and hydrogen chloride is heated at the above temperature, and then reacted with metallic silicon and tetrachlorosilane. The supply amount of each reactive species may be appropriately determined in consideration of the type and capacity of the reactor. A ratio of tetrachlorosilane to hydrogen is generally 1 to 5 moles of hydrogen per mole of tetrachlorosilane, and more preferably 1 to 3 moles of hydrogen per mole of tetrachlorosilane. A supply rate thereof may be set to an appropriate range according to the type and size of the reactor to be used. For example, when a fluidized bed reactor is used, the reactive species is supplied at a flow rate at which a fluidized bed can be formed. Further, the tetrachlorosilane and the hydrogen may be supplied after being diluted with an inert gas not involved in the reaction, for example, nitrogen gas or argon gas.

The reaction temperature in the production method of the present invention is appropriately determined in consideration of the material and capacity of the production apparatus, the catalyst to be used, and the like, but the reaction temperature is generally set in a range of 400° C. to 700° C., particularly 450° C. to 600° C.

The gas produced by the method of the present invention contains produced trichlorosilane, unreacted tetrachlorosilane, hydrogen, and silane and hydrogen chloride derived from the exhaust gas. The reaction product gas can be passed through a filter to remove solids such as metallic silicon particles, the chlorosilane is separated by condensation due to cooling, and then the condensate is subjected to distillation, whereby the generated trichlorosilane can be recovered with high purity.

That is, a cooling temperature of the reaction product gas when the chlorosilane is condensed and separated may be equal to or lower than a temperature at which the chlorosilane is condensed, and is appropriately determined in consideration of the cooling capacity of the cooling device and the like. The cooling temperature is generally set to −10° C. or lower, and particularly −30° C. or lower. The same applies to a pressure during condensation and separation, the pressure is usually set at 300 kPaG or more, and particularly 500 kPaG or more, and the chlorosilane is condensed and separated by cooling.

The chlorosilane collected by condensation contains tetrachlorosilane and dichlorosilane in addition to the generated trichlorosilane, and the tetrachlorosilane and the dichlorosilane are separated from the trichlorosilane by distillation.

<Use of Trichlorosilane>

The trichlorosilane produced in the present invention is used as a raw material for deposition in a process of producing polycrystalline silicon. That is, the trichlorosilane can be used as a raw material gas in the production of polycrystalline silicon by the Siemens method in which a silicon core wire is provided inside a reaction furnace, the silicon core wire is heated to a deposition temperature of silicon by energization, a raw material gas for silicon deposition composed of trichlorosilane and a reducing gas is supplied into a reaction chamber in this state, and silicon is deposited on the silicon core wire by a chemical vapor deposition method.

A known production apparatus can be used to produce polycrystalline silicon by the Siemens method. Specifically, examples thereof include a reaction furnace having a structure in which an interior is sealed with a bell jar and a bottom plate, the bottom plate is provided with an electrode pair for holding a plurality of silicon core wires and energizing the silicon core wires, and a plurality of gas supply nozzles for supplying a raw material gas for silicon deposition to an internal space of the bell jar are provided.

A polycrystalline silicon rod can be produced by using the reaction furnace and supplying the raw material gas for silicon deposition containing trichlorosilane produced by the production method of the present invention from the gas supply nozzles while energizing the silicon core wires to deposit polycrystalline silicon on the silicon core wires. As the production conditions and the like in the production of polycrystalline silicon, known conditions can be used without particular limitation.

EXAMPLES

Hereinafter, the present invention will be further described with reference to examples, but the present invention is not limited to these examples.

Example 1

Preparation of Mixed Gas

A mixed gas used in Examples was produced using a composition adjustment device shown in FIG. 1. In the composition adjustment device shown in FIG. 1, a gas bubbling container 140, a cooling device 150 capable of cooling the gas bubbling container 140, a hydrogen chloride supply pipe 120 for supplying hydrogen chloride to the bubbling container 140, and a silane hydride supply pipe 130 are connected. A gas discharged from the gas bubbling container is discharged from the gas discharge pipe 160. A hydrogen gas supply pipe 110 is connected to the hydrogen chloride supply pipe 120 and the gas discharge pipe 160. A thermometer (not shown) for measuring a temperature in the gas bubbling container 140 is installed, and a pressure gauge (not shown) is installed in the gas discharge pipe 160.

The gas bubbling container 140 was filled with about 3 kg of a silane hydride solution having a composition of 5% by weight of dichlorosilane, 85% by weight of trichlorosilane, and 10% by weight of tetrachlorosilane, and the gas bubbling container 140 was cooled to −40° C.

A mixed gas flow containing 0.1 NL (normal liter)/min of 5 mol % hydrogen chloride-containing hydrogen and 2.0 NL/min of 9.99 mol % hydrogen was bubbled into the silane hydride solution so that a residence time in the silane hydride solution was 30 seconds. The gas discharged from the gas bubbling container at a flow rate of 2.1 NL/min was recovered by the bubbling and analyzed by gas chromatography, and as a result, the hydrogen contained 0.24 mol % of hydrogen chloride, 0.029 mol % of dichlorosilane, 0.37 mol % of trichlorosilane, and 0.013 mol % of tetrachlorosilane.

The hydrogen gas discharged from the gas bubbling container (a flow rate of 2.1 NL/min) and 99.99 mol % hydrogen (17 NL/min) were mixed, and the obtained mixed gas was stored in a hydrogen gas tank.

The hydrogen gas stored in the hydrogen gas tank was analyzed by gas chromatography, and as a result, the hydrogen gas contained 99.71 mol % of hydrogen, 270 molar ppm of hydrogen chloride, 458 molar ppm of silane hydride, and 15 molar ppm of tetrachlorosilane.

<Heating of Mixed Gas>

FIG. 2 is a schematic view showing an example of a configuration of a production apparatus in Examples and Comparative Examples. In FIG. 2, the production apparatus includes a Composition adjustment device 100 for adjusting a composition of hydrogen gas, a hydrogen gas drum 200 for storing the prepared hydrogen gas, a mixer 300 for mixing the hydrogen gas fed from the hydrogen gas drum 200 and tetrachlorosilane, a preheater 400 for heating the mixed gas to 100° C. to 450° C., and a reactor 500 for reacting the heated hydrogen and tetrachlorosilane with metallic silicon. In FIG. 2, the preheater 400 includes three preheaters (a first preheater 410, a second preheater 420, and a third preheater 430). The hydrogen gas drum is provided with a pipe (not shown) for extracting gas. The extracted gas is connected to a gas sampler (not shown) for gas chromatography, and the gas in the drum is analyzed online.

The hydrogen gas fed from the hydrogen gas drum 200 was supplied to the mixer 300 at 19 NL/min, and 99.99 mol % tetrachlorosilane was supplied at 7 NL/min and mixed. The mixed gas was fed to the first preheater 410 and heated to 100° C. The mixed gas from the first preheater 410 was then fed to the second preheater 420 and heated to 450° C. A heating time in the second preheater was 5.1 seconds as a result of calculation by dividing a volume (liter) of a heating zone by a gas flow rate (NL/min).

The mixed gas from the second preheater 420 was fed to the third preheater 430 and heated to a reaction temperature (500° C.) of the reactor. In a heating zone of the third preheater 430, test pieces made of SUS304 and SUS316 were installed at portions where the gas temperature is expected to be 450° C. to 500° C. The test pieces were plate pieces with a length of about 10 mm, a width of about 50 mm, and a thickness of about 2 mm. Ten test pieces were prepared for each material, small holes were formed in each of the test pieces, and the test pieces were suspended in the pipe through a wire.

<Reaction of Metallic Silicon, Tetrachlorosilane and Hydrogen>

As the reactor 500, a stainless-steel fluidized bed reactor with an inner diameter of 25 mm was used, 240 g of metallic silicon powder (purity: 98%, impurities including iron, aluminum, carbon, and the like) and 15 g of copper chloride powder were initially filled on a gas dispersion plate in the reactor, the reaction temperature was set to 500° C., and the pressure was set to 0.7 MPa (gauge pressure). The metallic silicon powder was supplied into the fluidized bed at a rate of 300 g/hr. The temperature of the pipe through which the gas passed was kept so that the temperature of the exhaust gas from the reactor was maintained at 500° C. The above reaction was continuously performed for 500 hours. After the completion of the reaction, the test pieces were taken out and a corrosion rate was measured. The corrosion rate was calculated by dividing a weight change amount before and after the reaction by the reaction time, and as a result, the corrosion rate was less than 0.1 mm/year in both the test pieces made of SUS304 and SUS316.

Examples 2 and 3 and Comparative Example 1

The mixed gas shown in Table 1 was prepared, and the mixed gas was heated under the conditions shown in Table 1, and then reacted with metallic silicon and tetrachlorosilane in the same manner as in Example 1. Example 2 is an example in which the gas bubbling container 140 was cooled at −20° C., and Example 3 is an example in which the amount of 99.99 mol % hydrogen mixed with the hydrogen gas discharged from the gas bubbling container was doubled. Comparative Example 1 is an example in which the silane hydride is not contained. The residence time in the second preheater and the corrosion rate of the test piece installed in the third preheater are shown in Table 1.

TABLE 1

|  |  | Example 1 | Example 2 | Example 3 | Comparative Example 1 |
|---|---|---|---|---|---|
| Composition of mixed gas | | | | | |
| Hydrogen | mol % | 99.91 | 99.78 | 99.96 | 99.97 |
| Hydrogen chloride | molar ppm | 270 | 290 | 135 | 270 |
| Dichlorosilane | molar ppm | 33 | 215 | 17 | 0 |
| Trichlorosilane | molar ppm | 425 | 1,100 | 213 | 0 |
| Tetrachlorosilane | molar ppm | 15 | 45 | 7 | 0 |
| Heating of mixed gas | | | | | |
| Holding time of second preheater | Seconds | 5.1 | 8.1 | 2.6 | 5.1 |
| Temperature around test piece | ° C. | 495~498 | 495~498 | 495~498 | 495~498 |
| Corrosion rate of test piece | | | | | |
| SUS304 | mm/Y | 0.1 or less | 0.1 or less | 0.1 or less | 0.25 |
| SUS316 | mm/Y | 0.1 or less | 0.1 or less | 0.1 or less | 0.15 |

REFERENCE SIGNS LIST

100 Composition adjustment device
110 Hydrogen gas supply pipe

120 Hydrogen chloride supply pipe
130 Silane hydride supply pipe
140 Gas bubbling container
150 Cooling device
160 Gas discharge pipe
200 Hydrogen gas drum
300 Mixer
400 Preheater
410 First preheater
420 Second preheater
430 Third preheater
500 Reactor

The invention claimed is:

1. A method for producing trichlorosilane, the method comprising:
reacting metallic silicon and tetrachlorosilane with a mixed gas containing hydrogen to generate trichlorosilane, wherein
the mixed gas containing hydrogen contains 1 to 500 molar ppm of hydrogen chloride and 100 to 10000 molar ppm of silane hydride, and
the mixed gas is heated at 100° C. to 450° C. and then reacted.

2. The method for producing trichlorosilane according to claim 1, wherein the mixed gas is held for at least 3 seconds at 100° C. to 450° C. and then reacted.

3. The method for producing trichlorosilane according to claim 1, wherein the mixed gas is mixed with tetrachlorosilane, and then the mixed gas containing the tetrachlorosilane is heated at 100° C. to 450° C.

4. The method for producing trichlorosilane according to claim 1, wherein the mixed gas contains an exhaust gas obtained by condensing and separating trichlorosilane from a reaction product gas containing the trichlorosilane obtained by reacting metallic silicon with hydrogen chloride to generate the trichlorosilane.

5. The method for producing trichlorosilane according to claim 1, wherein the mixed gas contains an exhaust gas obtained by condensing and separating trichlorosilane from a reaction product gas containing the trichlorosilane obtained by reacting metallic silicon and tetrachlorosilane with hydrogen to generate the trichlorosilane.

6. The method for producing trichlorosilane according to claim 1, wherein the mixed gas contains an exhaust gas obtained by condensing and separating trichlorosilane from an exhaust gas obtained by reacting the trichlorosilane with hydrogen to generate polycrystalline silicon.

7. A method for producing trichlorosilane, the method comprising:
obtaining a reaction product gas containing trichlorosilane by the production method according to claim 1, and
condensing and separating the trichlorosilane from the reaction product gas.

8. A method for producing a polycrystalline silicon rod, the method comprising:
using a reaction furnace having a structure in which
an interior is sealed with a bell jar and a bottom plate,
the bottom plate is provided with an electrode pair for holding a plurality of silicon core wires and energizing the silicon core wires, and
a plurality of gas supply nozzles for supplying a raw material gas for silicon deposition to an internal space of the bell jar are provided; and
ejecting the raw material gas for silicon deposition from the gas supply nozzles while energizing the silicon core wires to deposit polycrystalline silicon on the silicon core wires, wherein
the raw material gas for silicon deposition contains the trichlorosilane obtained by the production method according to claim 7.

* * * * *